United States Patent
Jin

(10) Patent No.: US 8,419,393 B2
(45) Date of Patent: Apr. 16, 2013

(54) COMPRESSOR HAVING BEARING ASSEMBLY

(75) Inventor: Hanghai Jin, Suzhou (CN)

(73) Assignee: Emerson Climate Technologies, Inc., Sidney, OH (US)

( * ) Notice: Subject to any disclaimer, the term of this patent is extended or adjusted under 35 U.S.C. 154(b) by 587 days.

(21) Appl. No.: 12/713,805

(22) Filed: Feb. 26, 2010

(65) Prior Publication Data
US 2010/0233001 A1    Sep. 16, 2010

Related U.S. Application Data

(60) Provisional application No. 61/159,194, filed on Mar. 11, 2009.

(51) Int. Cl.
*F03C 2/00* (2006.01)
*F03C 4/00* (2006.01)
*F04C 2/00* (2006.01)

(52) U.S. Cl.
USPC ........ 418/55.3; 418/55.1; 418/55.2; 418/55.6

(58) Field of Classification Search ......... 418/55.1–55.6
See application file for complete search history.

(56) References Cited

U.S. PATENT DOCUMENTS
2005/0207926 A1* 9/2005 Nishiwaki et al. ........... 418/55.2

FOREIGN PATENT DOCUMENTS
KR    101996-0011684    8/1996
KR        100341273    6/2002
KR        100343727    7/2002
WO    2008144037 A1    11/2008

OTHER PUBLICATIONS

International Search Report regarding International Application No. PCT/US2010/000734, dated Oct. 28, 2010.
Written Opinion of the International Searching Authority regarding International Application No. PCT/US2010/000734, dated Oct. 28, 2010.

* cited by examiner

*Primary Examiner* — Zelalem Eshete
(74) *Attorney, Agent, or Firm* — Harness, Dickey & Pierce, P.L.C.

(57) ABSTRACT

A compressor may include a shell, a compression mechanism, a drive shaft, and first and second bearing housing assemblies. The compression mechanism may be supported within the shell and the drive shaft may have a first end drivingly engaged with the compression mechanism. The second bearing housing assembly may be located within and fixed to the shell. The second bearing housing may include a radially extending base portion defining an aperture rotatably supporting a second end of the drive shaft therein. The second bearing housing may additionally include a wall portion extending axially from the base portion and having a first region coupled to the shell at a first location, a second region coupled to the shell at a second location and a third region extending from the first region to the second region.

29 Claims, 2 Drawing Sheets

COMPRESSOR HAVING BEARING ASSEMBLY

CROSS-REFERENCE TO RELATED APPLICATION

This application claims the benefit of U.S. Provisional Application No. 61/159,194, filed on Mar. 11, 2009. The entire disclosure of the above application is incorporated herein by reference.

FIELD

The present disclosure relates to compressor bearing assemblies.

BACKGROUND

This section provides background information related to the present disclosure which is not necessarily prior art.

Compressors may include a drive shaft driving a compression mechanism. The drive shaft may include a first end engaged with the compression mechanism and a second end rotationally supported by a bearing located within a bearing housing. Loads applied to the bearing housing by the drive shaft may result in bending of the bearing housing.

SUMMARY

This section provides a general summary of the disclosure, and is not comprehensive of its full scope or all of its features.

A compressor may include a shell, a compression mechanism, a drive shaft, and first and second bearing housing assemblies. The compression mechanism may be supported within the shell and the drive shaft may have a first end drivingly engaged with the compression mechanism. The first bearing housing assembly may be fixed within the shell and may support the compression mechanism thereon. The first bearing housing assembly may rotatably support a first portion of the drive shaft. The second bearing housing assembly may be located within and fixed to the shell.

The second bearing housing assembly may include a radially extending base portion defining an aperture rotatably supporting a second end of the drive shaft therein. The second bearing housing may additionally include a wall portion extending axially from the base portion and having a first region coupled to the shell at a first location, a second region coupled to the shell at a second location and a third region extending from the first region to the second region.

The first and second regions may be disposed generally opposite one another on the base portion. The base portion may extend generally perpendicular to the drive shaft and the wall portion may extend generally parallel to the drive shaft.

Each of the first, second, and third regions may extend in a first axial direction from the base portion. The first, second, and third regions may be generally continuous with one another at a location between the base portion and a location distal to the base portion. The first region may define a first height in a first axial direction from the base portion and the third region may define a second height in the first axial direction from the base portion at least ten percent of the first height along an entirety of the extent of the third region. More specifically, the second height may be at least fifty percent of the first height.

The wall portion may additionally include a fourth region extending from the first region to the second region. The aperture may be located radially between the first and second regions and radially between the third and fourth regions. The first, second, third, and fourth regions may be generally continuous with one another at a location between the base portion and a location distal to the base portion. The first, second, third and fourth regions may define an outer radial perimeter of the second bearing housing assembly. The third and fourth regions may be radially offset from the shell. An axial end of the wall portion opposite the base portion may include a recess extending axially into the axial end.

In another arrangement, a compressor may include a shell, a compression mechanism, a drive shaft, and first and second bearing housing assemblies. The compression mechanism may be supported within the shell and the drive shaft may have a first end drivingly engaged with the compression mechanism. The first bearing housing assembly may be fixed within the shell and may support the compression mechanism thereon. The first bearing housing assembly may rotatably support a first portion of the drive shaft. The second bearing housing assembly may be located within and fixed to the shell.

The second bearing housing assembly may include a radially extending base portion defining an aperture rotatably supporting a second end of the drive shaft therein and a wall portion extending axially from and surrounding the base portion. The wall portion may include a first region coupled to the shell at a first location, a second region coupled to the shell at a second location, a third region extending continuously from the first region to the second region at a location between the base portion and a location distal to the base portion, and a fourth region extending continuously from the first region to the second region at a location between the base portion and a location distal to the base portion.

The first, second, third and fourth regions may define an outer radial perimeter of the second bearing housing. The third and fourth regions may be radially offset from the shell. The first and second regions may each extend at least a first height in a first axial direction from the base portion and the third and fourth regions may each extend at least a second height in the first axial direction from the base portion at least ten percent of the first height along an entirety of the extent of the third and fourth regions. More specifically, the second height may be at least fifty percent of the first height. An axial end of the wall portion opposite the base portion may include a recess extending axially into the axial end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
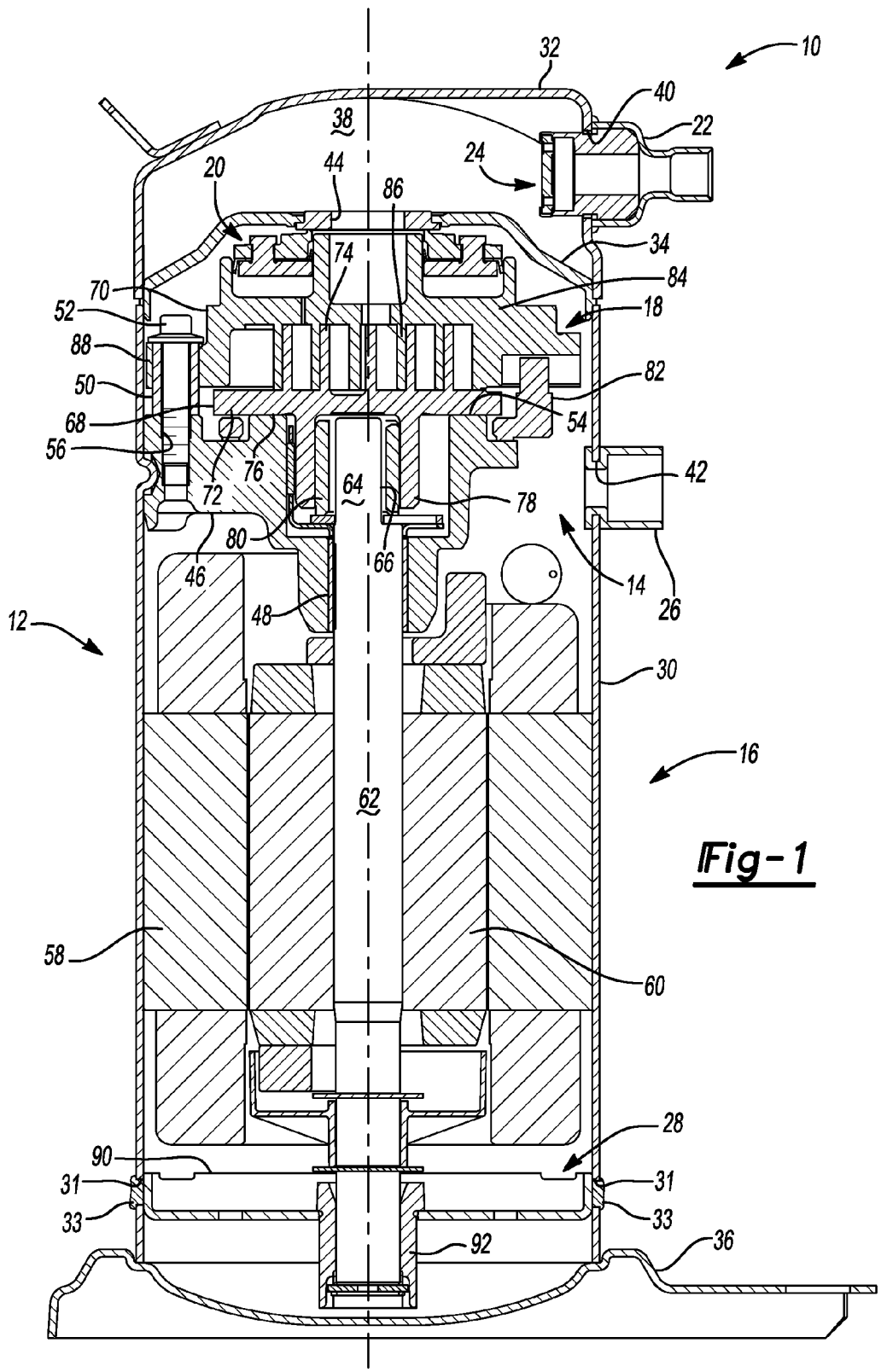
FIG. 1 is a section view of a compressor according to the present disclosure.

The following description is merely exemplary in nature and is not intended to limit the present disclosure, application, or uses. It should be understood that throughout the drawings, corresponding reference numerals indicate like or corresponding parts and features.

The present teachings are suitable for incorporation in many different types of scroll and rotary compressors, including hermetic machines, open-drive machines and non-hermetic machines. For exemplary purposes, a compressor 10 is shown as a hermetic scroll refrigerant-compressor of the low-side type, i.e., where the motor and compressor are cooled by suction gas in the hermetic shell, as illustrated in the vertical section shown in FIG. 1.

With reference to FIG. 1, compressor 10 may include a hermetic shell assembly 12, a first bearing housing assembly 14, a motor assembly 16, a compression mechanism 18, a seal assembly 20, a refrigerant discharge fitting 22, a discharge valve assembly 24, a suction gas inlet fitting 26, and a second bearing housing assembly 28. Shell assembly 12 may house first bearing housing assembly 14, motor assembly 16, compression mechanism 18, and second bearing housing assembly 28.

Shell assembly 12 may form a compressor housing and may include a cylindrical shell 30, an end cap 32 at the upper end thereof, a transversely extending partition 34, and a base 36 at a lower end thereof. End cap 32 and partition 34 may define a discharge chamber 38. Discharge chamber 38 may form a discharge muffler for compressor 10. Refrigerant discharge fitting 22 may be attached to shell assembly 12 at opening 40 in end cap 32. Discharge valve assembly 24 may be located within discharge fitting 22 and may generally prevent a reverse flow condition. Suction gas inlet fitting 26 may be attached to shell assembly 12 at opening 42. Partition 34 may include a discharge passage 44 therethrough providing communication between compression mechanism 18 and discharge chamber 38.

First bearing housing assembly 14 may be affixed to shell 30 at a plurality of points in any desirable manner, such as staking. First bearing housing assembly 14 may include a main bearing housing 46, a first bearing 48 disposed therein, bushings 50, and fasteners 52. Main bearing housing 46 may house first bearing 48 therein and may define an annular flat thrust bearing surface 54 on an axial end surface thereof. Main bearing housing 46 may include apertures 56 extending therethrough and receiving fasteners 52.

Motor assembly 16 may generally include a motor stator 58, a rotor 60, and a drive shaft 62. Motor stator 58 may be press fit into shell 30. Drive shaft 62 may be rotatably driven by rotor 60 and may be rotatably supported within first bearing 48. Rotor 60 may be press fit on drive shaft 62. Drive shaft 62 may include an eccentric crank pin 64 having a flat 66 thereon.

Compression mechanism 18 may generally include an orbiting scroll 68 and a non-orbiting scroll 70. Orbiting scroll 68 may include an end plate 72 having a spiral vane or wrap 74 on the upper surface thereof and an annular flat thrust surface 76 on the lower surface. Thrust surface 76 may interface with annular flat thrust bearing surface 54 on main bearing housing 46. A cylindrical hub 78 may project downwardly from thrust surface 76 and may have a drive bushing 80 rotatably disposed therein. Drive bushing 80 may include an inner bore in which crank pin 64 is drivingly disposed. Crank pin flat 66 may drivingly engage a flat surface in a portion of the inner bore of drive bushing 80 to provide a radially compliant driving arrangement. An Oldham coupling 82 may be engaged with the orbiting and non-orbiting scrolls 104, 106 to prevent relative rotation therebetween. Non-orbiting scroll 70 may include an end plate 84 having a spiral wrap 86 on a lower surface thereof, and a series of radially outwardly extending flanged portions 88 engaged with fasteners 52.

Figure 2:
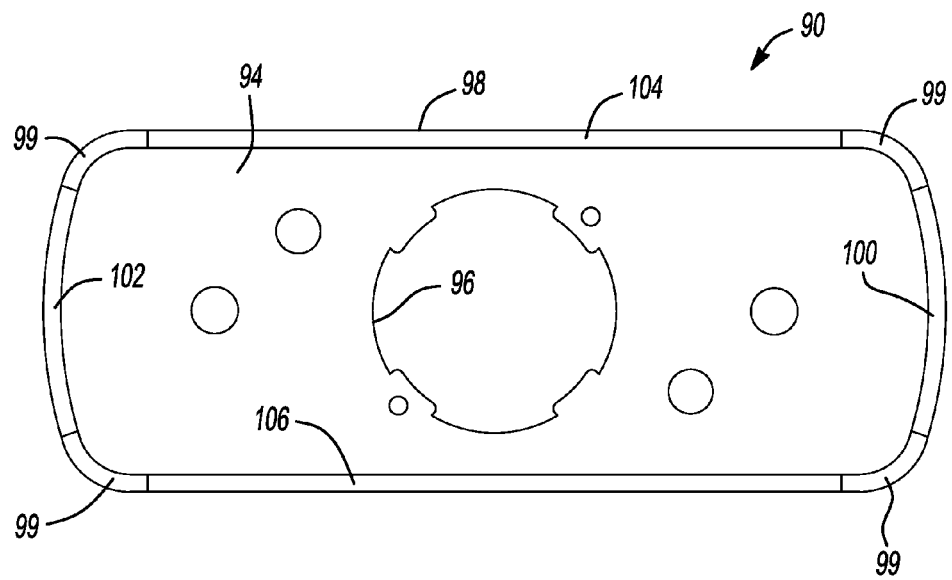
FIG. 2 is a plan view of a bearing housing of the compressor of FIG. 1.
Figure 3:
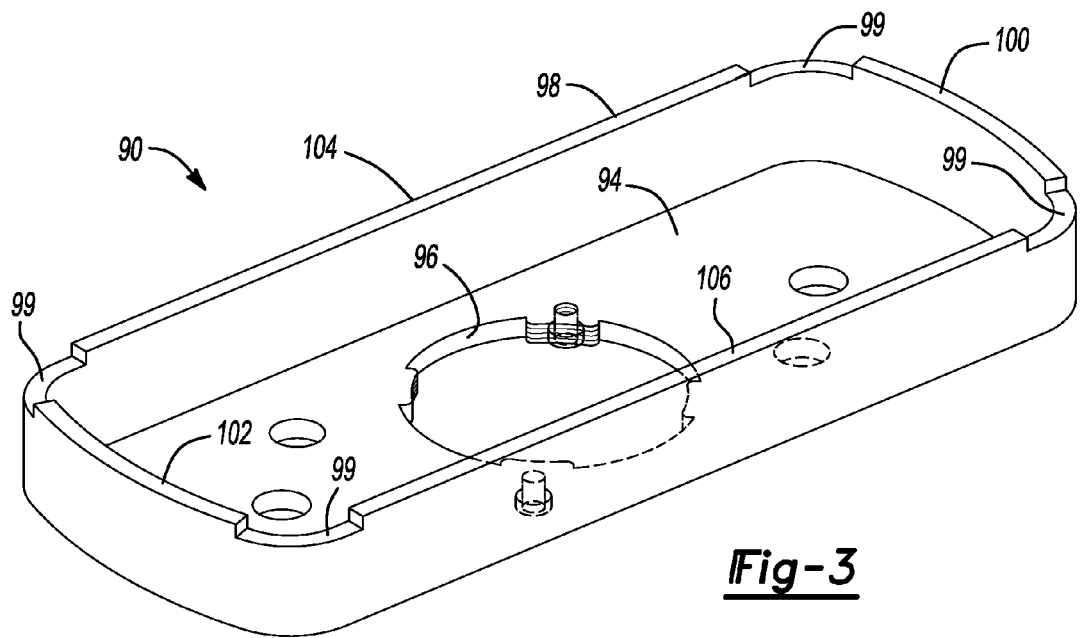
FIG. 3 is a perspective view of the bearing housing of FIG. 2.

Second bearing housing assembly 28 may include a lower bearing housing 90 supporting a second bearing 92. Drive shaft 62 may be rotatably supported by second bearing 92. With reference to FIGS. 2 and 3, lower bearing housing 90 may include a radially extending base portion 94 defining an aperture 96 housing second bearing 92 therein and a wall portion 98 extending axially from and surrounding base portion 94. Base portion 94 may extend generally perpendicular to cylindrical shell 30 and drive shaft 62. Wall portion 98 may extend generally parallel to cylindrical shell 30 and drive shaft 62 and may be fixed to cylindrical shell 30 in a variety of ways including welding. As seen in FIG. 1, cylindrical shell 30 may include apertures 31 for weld joints 33 securing lower bearing housing 90, and more specifically wall portion 98, to cylindrical shell 30.

Wall portion 98 may include recesses 99 extending axially into an axial end of wall portion 98 opposite base portion 94. Wall portion 98 may include first, second, third, and fourth regions 100, 102, 104, 106 each extending in a first axial direction from base portion 94. Recesses 99 may be located where first, second, third, and fourth regions 100, 102, 104, 106 meet one another. First and second regions 100, 102 may define ends of lower bearing housing 90 and may abut and be fixed to cylindrical shell 30. Third and fourth regions 104, 106 may define sides of lower bearing housing 90 and may be radially offset from cylindrical shell 30. First and second regions 100, 102 may be located generally opposite one another on the base portion 94, or approximately one-hundred and eighty degrees from one another.

Third and fourth regions 104, 106 may each extend from the first region 100 to the second region 102. First, second, third, and fourth regions 100, 102, 104, 106 may be generally continuous at a location between base portion 94 and a location distal to base portion 94, making wall portion 98 continuous at the location between base portion 94 and the location distal to base portion 94 around the entire perimeter of lower bearing housing 90.

First and second regions 100, 102 may each extend at least a first height in the first axial direction from base portion 94. Third and fourth regions 104, 106 may each extend at least a second height in the first axial direction from base portion 94. The present non-limiting example illustrates the first and second heights as being approximately equal to one another. However, the second height may be at least ten percent, and more specifically at least fifty percent, of the first height. The third and fourth regions 104, 106 may extend at least the second height from base portion 94 along their entire extent.

What is claimed is:

1. A compressor comprising:

a shell;

a compression mechanism supported within said shell;

a drive shaft having a first end drivingly engaged with said compression mechanism;

a first bearing housing assembly fixed within said shell and supporting said compression mechanism thereon, said first bearing housing assembly rotatably supporting a first portion of said drive shaft therein; and a second bearing housing assembly located within and fixed to said shell, said second bearing housing assembly including a radially extending base portion defining an aperture rotatably supporting a second end of said drive shaft therein and a wall portion extending axially from and surrounding said base portion, wherein an axial end of said wall portion opposite said base portion includes a recess extending axially into said axial end.

2. The compressor of claim 1, wherein said wall portion includes a first region coupled to said shell at a first location, a second region coupled to said shell at a second location, a third region extending continuously from said first region to said second region at a location between said base portion and a location distal to said base portion, and a fourth region extending continuously from said first region to said second region at a location between said base portion and a location distal to said base portion.

3. The compressor of claim 2, wherein said first, second, third and fourth regions define an outer radial perimeter of said second bearing housing.

4. The compressor of claim 2, wherein said third and fourth regions are radially offset from said shell.

5. The compressor of claim 2, wherein said first and second regions each extend at least a first height in a first axial direction from said base portion and said third and fourth regions each extend at least a second height in the first axial direction from said base portion at least ten percent of the first height along an entirety of the extent of said third and fourth regions.

6. The compressor of claim 5, wherein the second height is at least fifty percent of the first height.

7. The compressor of claim 1, wherein said wall portion includes a first region coupled to said shell at a first location, a second region coupled to said shell at a second location and a third region extending from said first region to said second region.

8. The compressor of claim 7, wherein said first and second regions of said wall portion are disposed generally opposite one another on said base portion.

9. The compressor of claim 7, wherein said base portion extends generally perpendicular to said drive shaft and said wall portion extends generally parallel to said drive shaft.

10. The compressor of claim 7, wherein each of said first, second and third regions of said wall portion extends axially from said base portion toward said first bearing housing.

11. The compressor of claim 7, wherein said first, second, and third regions are continuous with one another at a location between said base portion and a location distal to said base portion.

12. The compressor of claim 11, wherein said first region defines a first height in a first axial direction from said base portion and said third region defines a second height in the first axial direction from said base portion at least ten percent of the first height along an entirety of the extent of said third region.

13. The compressor of claim 12, wherein the second height is at least fifty percent of the first height.

14. A compressor bearing housing assembly comprising a radially extending base portion defining an aperture adapted to rotationally support an end of a compressor drive shaft therein and a wall portion extending axially from said base portion and including a first region adapted to be coupled to a compressor shell at a first location, a second region adapted to be coupled to the compressor shell at a second location, a third region extending from said first region to said second region, wherein an axial end of said wall portion opposite said base portion includes a recess extending axially into said axial end.

15. A compressor comprising:
a shell;
a compression mechanism supported within said shell;
a drive shaft having a first end drivingly engaged with said compression mechanism;
a first bearing housing assembly fixed within said shell and supporting said compression mechanism thereon, said first bearing housing assembly rotatably supporting a first portion of said drive shaft therein; and
a second bearing housing assembly located within and fixed to said shell, said second bearing housing assembly including a radially extending base portion defining an aperture rotatably supporting a second end of said drive shaft therein and a wall portion extending axially from and surrounding said base portion,
wherein said wall portion includes a first region coupled to said shell at a first location, a second region coupled to said shell at a second location and a third region extending from said first region to said second region, said third region being spaced apart from said shell.

16. The compressor of claim 15, wherein an axial end of said wall portion opposite said base portion includes a recess extending axially into said axial end.

17. The bearing housing assembly of claim 15, wherein said first and second regions are generally opposite one another on said base portion.

18. The bearing housing assembly of claim 15, wherein said wall portion extends generally perpendicular to said base portion.

19. The bearing housing assembly of claim 15, wherein said first, second, and third regions are continuous with one another at a location between said base portion and a location distal to said base portion.

20. The bearing housing assembly of claim 15, further comprising a fourth region extending from said first region to said second region, said aperture being located radially between said first and second regions and radially between said third and fourth regions.

21. The bearing housing assembly of claim 20, wherein said first and second regions each extend at least a first height in a first axial direction from said base portion and said third and fourth regions each extend at least a second height in the first axial direction from said base portion at least ten percent of the first height along an entirety of the extent of said third and fourth regions.

22. The bearing housing assembly of claim 21, wherein the second height is at least fifty percent of the first height.

23. The bearing housing assembly of claim 20, wherein said first, second, third and fourth regions are continuous with one another at a location between said base portion and a location distal to said base portion.

24. The bearing housing assembly of claim 20, wherein said first, second, third and fourth regions define an outer radial perimeter of said base portion.

25. The bearing housing assembly of claim 24, wherein a radial spacing between said first and second regions is greater than a radial spacing between said third and fourth regions providing a radially offset between said third and fourth regions and the shell.

26. The bearing housing assembly of claim 15, wherein said first region defines a first height in a first axial direction from said base portion and said third region defines a second height in the first axial direction from said base portion at least ten percent of the first height along an entirety of the extent of the third region.

27. The bearing housing assembly of claim 26, wherein the second height is at least fifty percent of the first height.

28. The bearing housing assembly of claim 15, wherein said wall portion extends from said base portion toward said first bearing housing assembly.

29. The compressor of claim 15, wherein said wall portion includes a fourth region extending from said first region to said second region, said fourth region being substantially parallel to said third region and spaced apart from said shell and said third region.

* * * * *